(12) United States Patent
Balakrishnan et al.

(10) Patent No.: US 11,349,398 B2
(45) Date of Patent: *May 31, 2022

(54) SWITCHED MODE POWER CONVERTER CONTROLLER WITH RAMP TIME MODULATION

(71) Applicant: Power Integrations, Inc., San Jose, CA (US)

(72) Inventors: Balu Balakrishnan, Saratoga, CA (US); Roland Sylvere Saint-Pierre, San Jose, CA (US); Giao Minh Pham, Milpitas, CA (US); Lance M. Wong, Milpitas, CA (US)

(73) Assignee: POWER INTEGRATIONS, INC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,840

(22) Filed: Sep. 11, 2020

(65) Prior Publication Data
US 2021/0028708 A1    Jan. 28, 2021

Related U.S. Application Data

(63) Continuation of application No. 16/173,843, filed on Oct. 29, 2018, now Pat. No. 10,811,977, which is a
(Continued)

(51) Int. Cl.
*H02M 3/335* (2006.01)
*H02M 3/156* (2006.01)
(Continued)

(52) U.S. Cl.
CPC ..... *H02M 3/33507* (2013.01); *H02M 1/0025* (2021.05); *H02M 1/08* (2013.01);
(Continued)

(58) Field of Classification Search
CPC ..... H02M 1/08; H02M 3/1566; H02M 1/0025
See application file for complete search history.

(56) References Cited

U.S. PATENT DOCUMENTS 5,162,970 A    11/1992  Davis, Jr. et al.
5,650,357 A     7/1997  Dobkin et al.
              (Continued)

FOREIGN PATENT DOCUMENTS

CN        1937384 A      3/2007
CN      101291112 A     10/2008
              (Continued)

OTHER PUBLICATIONS

EP Patent Application No. 14157602.5—European Search Report, dated Mar. 4, 2015 (3 pages).
(Continued)

*Primary Examiner* — Alex Torres-Rivera
(74) *Attorney, Agent, or Firm* — Christensen O'Connor Johnson Kindness PLLC

(57) ABSTRACT

A controller to regulate a power converter includes a terminal that receives an enable signal including enable events representative of an output of the power converter. A drive circuit generates a drive signal to control switching of a power switch to control an energy transfer from an input to an output of the power converter. The drive circuit turns on the power switch when an enable event is received in the enable signal. A current limit threshold generator is coupled to the drive circuit to generate a threshold signal. The threshold signal increases in response to the power switch turning off and subsequently decreases. The threshold signal and a time between consecutive enable events are used to modulate the drive signal to regulate the output of the power converter.

14 Claims, 8 Drawing Sheets

Related U.S. Application Data continuation of application No. 15/795,785, filed on Oct. 27, 2017, now Pat. No. 10,158,295, which is a continuation of application No. 14/961,575, filed on Dec. 7, 2015, now Pat. No. 9,837,911, which is a continuation of application No. 13/800,769, filed on Mar. 13, 2013, now Pat. No. 9,246,392.

(51) Int. Cl.
*H02M 1/08* (2006.01)
*H02M 1/00* (2006.01)
*H02M 3/157* (2006.01)

(52) U.S. Cl.
CPC ........... *H02M 3/156* (2013.01); *H02M 3/335* (2013.01); *H02M 3/157* (2013.01); *H02M 3/33515* (2013.01)

(56) References Cited

U.S. PATENT DOCUMENTS

| | | | |
|---|---|---|---|
| 6,384,478 | B1 | 5/2002 | Pour |
| 6,781,357 | B2 | 8/2004 | Balakrishnan et al. |
| 6,998,952 | B2 | 2/2006 | Zhou et al. |
| 7,468,547 | B2 | 12/2008 | Harvey |
| 7,524,731 | B2 | 4/2009 | Wang |
| 7,595,624 | B2 | 9/2009 | Tateishi et al. |
| 7,612,544 | B2 | 11/2009 | Brokaw et al. |
| 7,619,297 | B2 | 11/2009 | Wang |
| 7,868,431 | B2 | 1/2011 | Feng et al. |
| 7,884,696 | B2 | 2/2011 | Hébert et al. |
| 8,093,983 | B2 | 1/2012 | Fouquet et al. |
| 8,098,506 | B2 | 1/2012 | Saint-Pierre |
| 8,278,899 | B2 | 10/2012 | Schafmeister et al. |
| 8,344,707 | B2 | 1/2013 | Melanson et al. |
| 8,427,848 | B2 | 4/2013 | Lund |
| 8,477,516 | B2 | 7/2013 | Chien et al. |
| 8,772,909 | B1 | 7/2014 | Vinciarelli |
| 9,246,392 | B2 | 1/2016 | Balakrishnan et al. |
| 2003/0076078 | A1 | 4/2003 | Balakrishnan et al. |
| 2004/0214376 | A1 | 10/2004 | Gibson et al. |
| 2005/0271148 | A1 | 12/2005 | Dupuis |
| 2007/0007938 | A1 | 1/2007 | Djenguerian et al. |
| 2007/0047268 | A1 | 3/2007 | Djenguerian et al. |
| 2008/0084713 | A1 | 4/2008 | Baurle et al. |
| 2009/0141521 | A1 | 6/2009 | Yang |
| 2010/0194367 | A1 | 8/2010 | Lund et al. |
| 2010/0302811 | A1 | 12/2010 | Saint-Pierre |
| 2011/0063879 | A1 | 3/2011 | Murata |
| 2011/0267843 | A1 | 11/2011 | Djenguerian et al. |
| 2011/0285685 | A1 | 11/2011 | Naito et al. |
| 2012/0002448 | A1 | 1/2012 | Djenguerian et al. |
| 2012/0043949 | A1 | 2/2012 | Nakamura |
| 2012/0075891 | A1 | 3/2012 | Zhang et al. |
| 2012/0147630 | A1 | 6/2012 | Cao et al. |
| 2012/0161739 | A1 | 6/2012 | Lund |
| 2013/0027990 | A1 | 1/2013 | Bäurle et al. |
| 2013/0033902 | A1 | 2/2013 | Zhang |
| 2013/0051089 | A1 | 2/2013 | Pan et al. |
| 2013/0063101 | A1 | 3/2013 | Nene |
| 2013/0077358 | A1 | 3/2013 | Gaknoki et al. |
| 2013/0083566 | A1 | 4/2013 | Gaknoki et al. |
| 2014/0192565 | A1* | 7/2014 | Wang ................ H02M 3/33592 363/21.14 |
| 2014/0268922 | A1 | 9/2014 | Balakrishnan et al. |

FOREIGN PATENT DOCUMENTS

| | | |
|---|---|---|
| EP | 1912320 A2 | 4/2008 |
| EP | 2073365 A2 | 6/2009 |
| EP | 2299577 A1 | 3/2011 |
| GB | 2 448 741 A | 10/2008 |
| JP | H 09-260569 | 10/1997 |

OTHER PUBLICATIONS

EP Patent Application No. 14157602.5—European Office Action, dated Mar. 31, 2015 (4 pages).
EP Patent Application No. 14157602.5—European Office Action, dated Dec. 10, 2015 (6 pages).
PRC (China) Patent Application No. 201410090326.8—Chinese Office Action with Translation, dated Jun. 29, 2017 (10 pages).
EP Patent Application No. 17186834.2—Extended European Search Report, dated Oct. 24, 2017 (5 pages).
PRC (China) Patent Application No. 201410090326.8—Chinese Office Action with Translation, dated Mar. 13, 2018 (6 pages).
European Patent Application No. 17186834.2—EPO Office Action dated Sep. 2, 2018, 4 pages.
Japanese Patent Application No. 2018-073587—Japanese Office Action and English Translation dated Nov. 15, 2018, 8 pages.
Indian Patent Application No. 541/DEL/2014—Office Action dated May 7, 2019, 7 pages.
Chinese Patent Application No. 201811049201.5—Chinese Office Action and Search Report and English Translation dated Dec. 25, 2019, 10 pages.
European Patent Application No. 19209915.8—Extended European Search Report, dated Jan. 16, 2020, 7 pages.
Chinese Patent Application No. 201811049201.5—Chinese Office Action and Search Report and English Translation dated Aug. 12, 2020, 8 pages.
European Patent Application No. 19209915.8—European Office Action dated Jan. 1, 2021, 5 pages.
European Office Action, European Patent Application No. 19209915.8, dated Mar. 28, 2022, 6 pages.

* cited by examiner

SWITCHED MODE POWER CONVERTER CONTROLLER WITH RAMP TIME MODULATION

CROSS-REFERENCE TO RELATED APPLICATIONS

This application is a continuation of U.S. patent application Ser. No. 16/173,843, filed Oct. 29, 2018, now pending, which is a continuation of U.S. patent application Ser. No. 15/795,785, filed on Oct. 27, 2017, now U.S. Pat. No. 10,158,295, which is a continuation of U.S. patent application Ser. No. 14/961,575, filed on Dec. 7, 2015, now U.S. Pat. No. 9,837,911, which is a continuation of U.S. patent application Ser. No. 13/800,769, filed on Mar. 13, 2013, now U.S. Pat. No. 9,246,392. U.S. patent application Ser. No. 16/173,843, U.S. Pat. No. 10,158,295, U.S. Pat. No. 9,837,911, and U.S. Pat. No. 9,246,392 are hereby incorporated by reference.

BACKGROUND INFORMATION

Field of the Disclosure

The present invention relates generally to power converters, and more specifically to controllers for switched mode power converters.

Background

Electronic devices use power to operate. Switched mode power converters are commonly used due to their high efficiency, small size and low weight to power many of today's electronics. Conventional wall sockets provide a high voltage alternating current. In a switching power converter a high voltage alternating current (ac) input is converted to provide a well regulated direct current (dc) output through an energy transfer element. In operation, a switch is utilized to provide the desired output by varying the duty cycle (typically the ratio of the ON time of the switch to the total switching period), varying the switching frequency or varying the number of pulses per unit time of the switch in a switched mode power converter.

The switched mode power converter also includes a controller. Output regulation may be achieved by sensing and controlling the output in a closed loop. The controller may receive a signal representative of the output and the controller varies one or more parameters in response to the signal to regulate the output to a desired quantity. Various modes of control may be utilized such as pulse width modulation (PWM) control or ON/OFF control.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
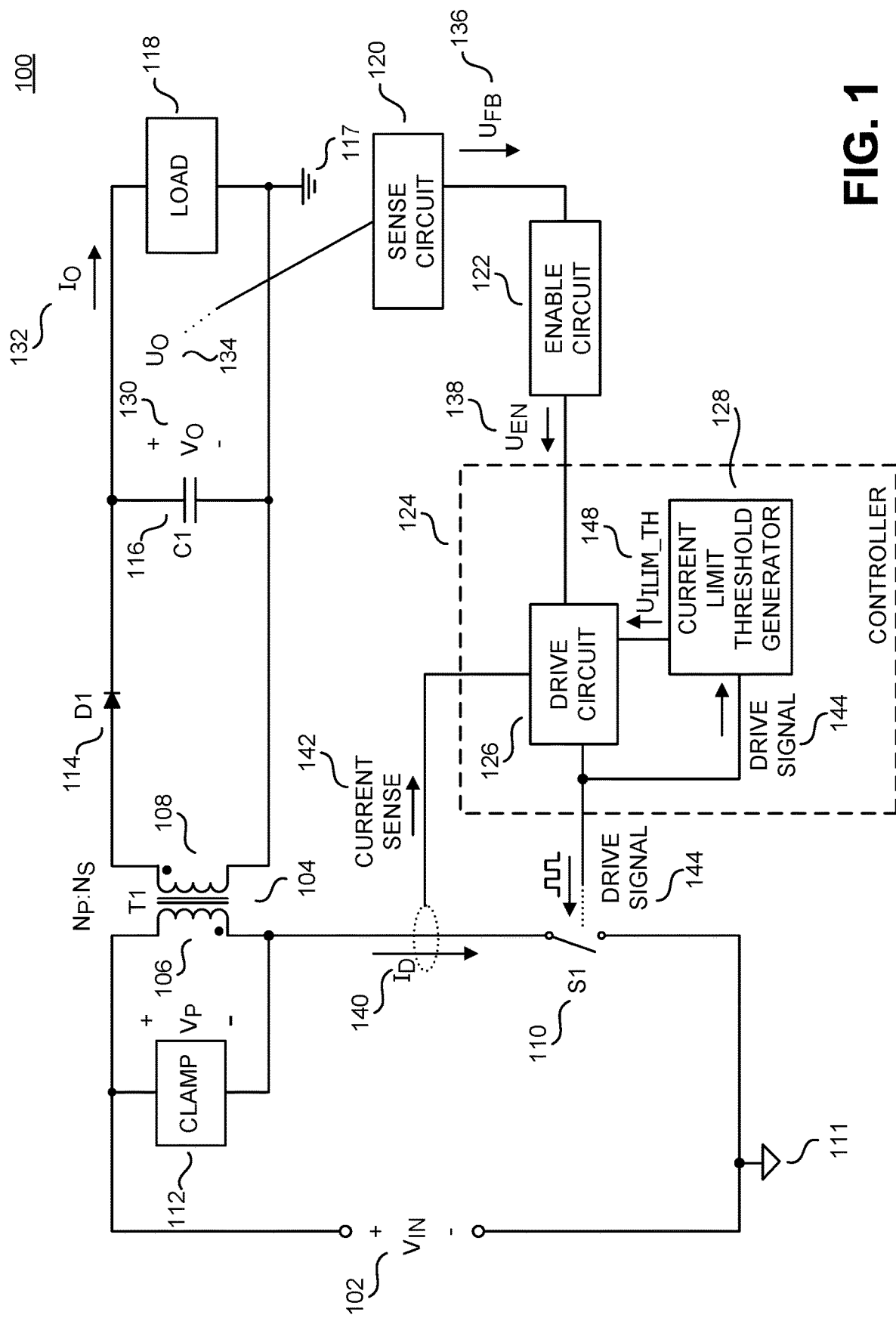
FIG. 1 is a diagram illustrating an example switched mode power converter utilizing a controller, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Various modes of control may be utilized to regulate the output of a power converter. In PWM peak current mode control, the switch remains ON until the current in the switch reaches a regulation threshold. Once the regulation threshold is reached, the controller turns the switch off for the remainder of the switching period. In general, the controller regulates the output of the power converter by altering the duty ratio of the switch. The controller may alter the duty ratio by altering the magnitude of the regulation threshold. A greater regulation threshold corresponds to a longer ON time and a larger duty ratio for the switch. However, it should be appreciated that the regulation threshold is generally fixed for an individual switching cycle. For PWM peak current mode control, the controller generally receives an analog signal representative of the output of the power converter. In one example, the signal received by the controller may convey how far away the sensed output of the power converter is from the desired quantity. The controller then alters the duty ratio of the switch based on the received analog signal.

Another mode of control is known as ON/OFF control, which enables or disables a switching cycle. When a cycle is enabled, the switch may conduct current while the switch cannot conduct current during a disabled cycle. The controller produces a sequence of enabled and disabled switching cycles to regulate the output of the power converter. For ON/OFF control, the controller generally receives a logic signal representative of the output of the power converter. In one example, the signal received by the controller may be a series of logic-level pulses, which would enable or disable the switch. In another example, the signal received by the controller may be a digital signal used for enabling or disabling the switch.

In one type of ON/OFF control, the controller turns ON the switch for a fixed ON time during an enabled cycle. In another type of ON/OFF control, referred to as current limited ON/OFF control, the controller turns ON the switch during an enabled cycle and turns OFF the switch once the current in the switch reaches a current limit threshold. In general, utilizing an enable signal in the form of a logic state to represent the output of the power converter may be beneficial, as the enable signal may be more noise immune than an analog signal representative of the output. However, due to the enabling and disabling of cycles, the effective switching frequency of the power converter may fall into the audible noise range. In addition, the root-mean-squared (RMS) current may be higher for power converters using ON/OFF control and as such the power converter may be less efficient.

As will be discussed, examples in accordance with the teachings of the present invention provide a current limited ON/OFF control scheme with a variable current limit threshold. With discussed examples, the controller receives an enable signal representative of the output of the power converter. The enable signal includes a series of events, which enable or disable the power switch. In one example, the controller turns on the power switch in response to an event of the enable signal and turns off the power switch when the current in the power switch reaches the variable current limit threshold. The variable current limit threshold varies in response to the time between successive events of the enable signal. Further, the variable current limit threshold may vary in response to the time between events of the enable signal over a range of loads coupled to the output of the power converter. In one example, the variable current limit threshold may be a ramp signal and the ramp signal along with the time between events of the enable signal may be used to modulate the drive signal which controls the switching of the power switch to regulate the output of the power converter.

In one example, the variable current limit threshold increases at an increase rate at the end of each ON time of the power switch for a fixed time period or until the maximum current limit threshold is reached. In another example, the variable current limit increases with a fixed increase amount in response to the end of the ON time of the power switch. The variable current limit threshold then decreases at a decrease rate until the current in the power switch reaches the current limit threshold or the variable current limit threshold reaches the minimum current limit threshold. As such, examples in accordance with the teachings of the present invention may have increased efficiency and may reduce the likelihood of producing audible noise while preserving the benefits of a logic or digital enable signal representative of the output of the power converter.

To illustrate, FIG. 1 shows an example power converter 100 including input $V_{IN}$ 102, an energy transfer element T1 104, a primary winding 106 of the energy transfer element T1 104, a secondary winding 108 of the energy transfer element T1 104, a switch S1 110, input return 111, a clamp circuit 112, a rectifier D1 114, an output capacitor C1 116, an output return 117, a load 118, a sense circuit 120, an enable circuit 122, and a controller 124. Controller 124 further includes a drive circuit block 126 and a current limit threshold generator 128. In one example, enable circuit 122 and sense circuit 120 may also be included in controller 124. FIG. 1 further illustrates an output voltage $V_O$ 130, an output current $I_O$ 132, an output quantity $U_O$ 134, a feedback signal 136, an enable signal $U_{EN}$ 138, a switch current $I_D$ 140, a current sense signal 142, a drive signal 144, and a current limit threshold signal $U_{ILIM\_TH}$ 148. The example switched mode power converter 100 illustrated in FIG. 1 is coupled in a flyback configuration, which is just one example of a switched mode power converter that may benefit from the teachings of the present invention. It is appreciated that other known topologies and configurations of switched mode power converter may also benefit from the teachings of the present invention.

In the illustrated example, the power converter 100 provides output power to a load 118 from an unregulated input $V_{IN}$ 102. In one example, the input $V_{IN}$ 102 is a rectified and filtered ac line voltage. In another example, the input voltage $V_{IN}$ 102 is a dc input voltage. The input $V_{IN}$ 102 is coupled to the energy transfer element T1 104. In some examples, the energy transfer element T1 104 may be a coupled inductor. In other examples, the energy transfer element T1 104 may be transformer. In the example of FIG. 1, the energy transfer element T1 104 includes two windings, a primary winding 106 and secondary winding 108. $N_P$ and $N_S$ are the number of turns for the primary winding 106 and secondary winding 108, respectively. In the example of FIG. 1, primary winding 106 may be considered an input winding, and secondary winding 108 may be considered an output winding. The primary winding 106 is further coupled to power switch S1 110, which is then further coupled to the input return 111. In addition, the clamp circuit 112 is coupled across the primary winding 106 of the energy transfer element T1 104.

The secondary winding 108 of the energy transfer element T1 104 is coupled to the rectifier D1 114. In the example illustrated in FIG. 1, the rectifier D1 114 is exemplified as a diode and the secondary winding 108 is coupled to the anode of the diode. In some examples, the rectifier D1 114 may be a transistor used as a synchronous rectifier. When a transistor is utilized as a synchronous rectifier, another controller (referred to as a secondary controller) may be utilized to control the turning ON and OFF of the transistor. In examples, the enable circuit 122 and/or sense circuit 120 may be included in the secondary controller (not shown). As shown in the depicted example, the output capacitor C1 116 and the load 118 are coupled to the rectifier D1 114. In the example of FIG. 1, both the output capacitor C1 116 and the load 118 are coupled to the cathode of the diode. An output is provided to the load 118 and may be provided as either an output voltage $V_O$ 130, output current $I_O$ 132, or a combination of the two.

The power converter 100 further includes circuitry to regulate the output, which is exemplified as output quantity $U_O$ 134. A sense circuit 120 is coupled to sense the output quantity $U_O$ 134 and to provide feedback signal $U_{FB}$ 136, which is representative of the output quantity $U_O$ 134. Feedback signal $U_{FB}$ 136 may be voltage signal or a current signal. In one example, the sense circuit 120 may sense the output quantity from an additional winding included in the energy transfer element T1 104 In another example, there may be a galvanic isolation (not shown) between the controller 124 and the enable circuit 122 or between the enable circuit 122 and the sense circuit 120. The galvanic isolation could be implemented by using devices such as an opto-coupler, a capacitor or a magnetic coupling. In a further example, the sense circuit 120 may utilize a voltage divider to sense the output quantity $U_O$ 134 from the output of the power converter 100. In general, the output quantity $U_O$ 134 is either an output voltage $V_O$ 130, output current $I_O$ 132, or a combination of the two.

As shown in the depicted example, enable circuit 122 is coupled to sense circuit 120 and receives feedback signal $U_{FB}$ 136 representative of the output of power converter 100 from the sense circuit 120. Enable signal $U_{EN}$ 138 may be a voltage signal or a current signal. In one example, enable signal $U_{EN}$ 138 is also representative of the output of the power converter 100 and provides information to the controller 124 to enable or disable the power switch S1 110. Further, the enable signal $U_{EN}$ 138 may include one or more enable events, which cause the power switch S1 110 to be enabled (or disabled). For example, the power switch S1 110 may be enabled when an enable event in enable signal $U_{EN}$ 138 is received. In one example, the enable circuit 122 outputs enable signal $U_{EN}$ 138, which in one example is a rectangular pulse waveform with varying lengths of logic high and logic low sections. In another example, the enable signal $U_{EN}$ 138 may be a logic or digital signal. An enable event in enable signal $U_{EN}$ 138 may be a pulse or a series of pulses that enable (or disable) the power switch S1 110. In another example, an enable event in enable signal $U_{EN}$ 138 may be a transition from one logic state to another logic state, which enables (or disables) the power switch S1 110. In a further example, enable signal $U_{EN}$ 138 may be an analog signal, and an enable event may be indicated with enable signal $U_{EN}$ 138 crossing of a threshold value.

Controller 124 is coupled to the enable circuit 122 and receives enable signal $U_{EN}$ 138 from the enable circuit 122. The controller 124 further includes terminals for receiving the current sense signal 142 and for providing the drive signal 144 to power switch S1 110. The current sense signal 142 may be representative of the switch current $I_D$ 140 in power switch S1 110. Current sense signal 142 may be a voltage signal or a current signal. In addition, the controller 124 provides drive signal 144 to the power switch S1 110 to control various switching parameters to control the transfer of energy from the input of power converter 100 to the output of power converter 100. Examples of such parameters may include switching frequency, switching period, duty cycle, or respective ON and OFF times of the power switch S1 110.

As illustrated in example depicted in FIG. 1, the controller 124 includes drive circuit 126 and current limit threshold generator 128. The drive circuit 126 is coupled to receive the enable signal $U_{EN}$ 138. In one example, drive circuit 126 outputs drive signal 144 in response to the enable signal $U_{EN}$ 138. In some examples, drive circuit 126 further receives current sense signal 142 and outputs drive signal 144 in further response to the current sense signal 142. Current limit threshold generator 128 is coupled to receive the drive signal 144 from the drive circuit 126 and further outputs the current limit threshold signal $U_{ILIM\_TH}$ 148 to the drive circuit 126. In one example, current limit threshold generator 128 is coupled to vary the current limit threshold signal $U_{ILIM\_TH}$ 148 in response to a time between the enable events of the enable signal $U_{EN}$ 138. In one example, the current limit threshold signal $U_{ILIM\_TH}$ 148 may be a ramp signal and the ramp signal along with the time between enable events may be used to modulate the drive signal 144 to regulate the output of the power converter.

For instance, in one example, the current limit threshold generator 128 is coupled to increase, within a current limit threshold range, the current limit threshold signal $U_{ILIM\_TH}$ 148 at a increase rate during a fixed time period after an end of each ON time of the power switch S1 110. In the example, after the fixed time period after the end of each ON time of the power switch S1 110, the current limit threshold generator 128 is coupled to decrease the current limit threshold signal $U_{ILIM\_TH}$ 148, within the current limit threshold range, at a decrease rate until the current through power switch S1 110 reaches the current limit threshold. In one example, the current limit threshold signal $U_{ILIM\_TH}$ 148 may be a voltage signal or a current signal. As illustrated, the drive circuit 126 also outputs drive signal 144 in response to the current limit threshold signal $U_{ILIM\_TH}$ 148.

In the example of FIG. 1, input voltage $V_{IN}$ 102 is positive with respect to input return 111, and output voltage $V_O$ 130 is positive with respect to output return 117. In the example illustrated in FIG. 1, the input return 111 is galvanically isolated from the output return 117. In other words, a dc voltage applied between input return 111 and output return 117 would produce substantially zero current. Therefore, circuits electrically coupled to the primary winding 106 are galvanically isolated from circuits electrically coupled to the secondary winding 108. For example, galvanic isolation could be implemented by using an opto-coupler, a capacitive coupler or a magnetic coupler between the controller 124 and the enable circuit 122 or between the enable circuit 122 and the sense circuit 120.

In one example, the power converter 100 of FIG. 1 provides regulated output power to the load 118 from an unregulated input $V_{IN}$ 102. The power converter 100 utilizes the energy transfer element T1 104 to transfer energy between the primary 106 and secondary 108 windings. The clamp circuit 112 is coupled to the primary winding 106 of the energy transfer element T1 104 to limit the maximum voltage on the power switch S1 110. In the example power converter 100 shown in FIG. 1, the clamp circuit 112 limits the voltage spike caused by the leakage inductance of the primary winding 106 after the power switch S1 110 has turned OFF. Power switch S1 110 is opened and closed in response to the drive signal 144 received from the controller 124 to control the transfer of energy from the input of the power converter 100 to the output of power converter 100. It is generally understood that a switch that is closed may conduct current and is considered on, while a switch that is open cannot conduct current and is considered off. In the example of FIG. 1, power switch S1 110 controls a current $I_D$ 140 in response to controller 124 to meet a specified performance of the power converter 100. In some examples, the power switch S1 110 may be a transistor and the controller 124 may include integrated circuits and/or discrete electrical components. In one example, controller 124 and power switch S1 110 are included together in a single integrated circuit. In one example, the integrated circuit is a monolithic integrated circuit. In another example, the integrated circuit is a hybrid integrated circuit.

The operation of power switch S1 110 also produces a time varying voltage $V_P$ across the primary winding 106. By transformer action, a scaled replica of the voltage $V_P$ is produced across the secondary winding 108, the scale factor being the ratio that is the number of turns $N_S$ of secondary winding 108 divided by the number of turns $N_P$ of primary winding 106. The switching of power switch S1 110 also produces a pulsating current at the rectifier D1 114. The current in rectifier D1 114 is filtered by output capacitor C1 116 to produce a substantially constant output voltage $V_O$ 130, output current $I_O$ 132, or a combination of the two at the load 118.

In the illustrated example, sense circuit 120 senses the output quantity $U_O$ 134 to provide the feedback signal $U_{FB}$ 136 representative of the output of power converter 100 to the enable circuit 122. The enable circuit 122 receives the feedback signal $U_{FB}$ 136 and produces an enable signal $U_{EN}$ 138. The enable signal $U_{EN}$ 138 is representative of the output of the power converter 100 and provides information to the controller 124 (using enable events) to enable or disable the power switch S1 110. Further, the time between enable events of the enable signal $U_{EN}$ 138 is responsive to the power converter output. In examples, an enable event may be generated when the output quantity $U_O$ 134 or feedback signal $U_{FB}$ 136 falls below a threshold. In one example, the enable signal $U_{EN}$ 138 may utilize a pulse (the enable signal increases to a logic high value and decreases to a logic low value) as the enable event to control the power switch S1 110.

In the example of FIG. 1, the controller 124 receives the enable signal $U_{EN}$ 138 and also receives the current sense signal 142, which is representative of the sensed switch current $I_D$ 140 in the power switch S1 110. The switch current $I_D$ 140 may be sensed in a variety of ways, such as for example, the voltage across a discrete resistor or the voltage across the transistor when the transistor is conducting. The controller 124 outputs drive signal 144 to operate the power switch S1 110 in response to various inputs to substantially regulate the output quantity $U_O$ 134 to the desired value. With the use of the sense circuit 120, enable circuit 122, and the controller 124, the output of the power converter 100 is regulated in a closed loop in accordance with the teachings of the present invention.

As shown in the depicted example, controller 124 further includes drive circuit 126, which receives the enable signal $U_{EN}$ 138 and current sense signal 142. Drive circuit 126 outputs the drive signal 144 to control switching the power switch S1 110 in response to the enable signal $U_{EN}$ 138 and current sense signal 142 to control the transfer of energy from the input of power converter 100 to the output of power converter 100. In one example, drive circuit 126 turns ON the power switch S1 110 in response to an enable event. In one example, drive circuit 126 turns ON the power switch S1 110 when the enable signal $U_{EN}$ 138 pulses to a logic high value. In one example, drive circuit 126 turns OFF the power switch S1 110 when the switch current $I_D$ 140 represented with the current sense signal 142 reaches the current limit threshold signal $U_{ILIM\_TH}$ 148. In one example, the drive signal 144 is a rectangular pulse waveform with varying lengths of logic high and logic low sections. Drive signal 144 may be a voltage signal or a current signal. In one example, the power switch S1 110 is ON when the drive signal 144 is logic high and the power switch S1 110 is OFF when the drive signal 144 is logic low.

As shown in the depicted example, the drive signal 144 is also coupled to be received by the current limit threshold generator 128. In one example, the current limit threshold generator 128 generates the current limit threshold signal $U_{ILIM\_TH}$ 148 in response to the drive signal 144. As will be further discussed, the current limit threshold signal $U_{ILIM\_TH}$ 148 increases, within a current limit threshold range, at an increase rate for a fixed time period after the end of the ON time of the power switch S1 110. In other words, the current limit threshold signal $U_{ILIM\_TH}$ 148 increases by a fixed amount, within the current limit threshold range, at the end of the ON time of the power switch S1 110. Thus, in one example the current limit threshold signal $U_{ILIM\_TH}$ 148 does not increase beyond a maximum current limit threshold. After the fixed time period, the current limit threshold signal $U_{ILIM\_TH}$ 148 decreases, within the current limit threshold range, at a decrease rate. In one example, the current limit threshold signal $U_{ILIM\_TH}$ 148 decreases until the switch current $I_D$ 140 indicated by the current sense signal 142 reaches the current limit threshold signal $U_{ILIM\_TH}$ 148 or until the current limit threshold signal $U_{ILIM\_TH}$ 148 reaches a minimum current limit threshold.

As mentioned above, the drive signal 144 is generated in response to the enable signal $U_{EN}$ 138. In one example, current limit threshold generator 128 therefore also generates the current limit threshold signal $_{ILIM\_TH}$ 148 in response to the enable signal $U_{EN}$ 138. In particular, the current limit threshold signal $U_{ILIM\_TH}$ 148 is responsive to the time between enable events of the enable signal $U_{EN}$ 138 over a range of loads coupled to the output of the power converter 100. In another example, the current limit threshold signal $U_{ILIM\_TH}$ 148 may be a ramp signal and the ramp signal along with the time between enable events may be used to modulate the drive signal 144 to regulate the output of the power converter. As such, examples in accordance with the teachings of the present invention may have increased efficiency and may reduce the likelihood of producing audible noise while preserving the benefits of a logic or digital enable signal representative of the output of the power converter 100.

Figure 2A:
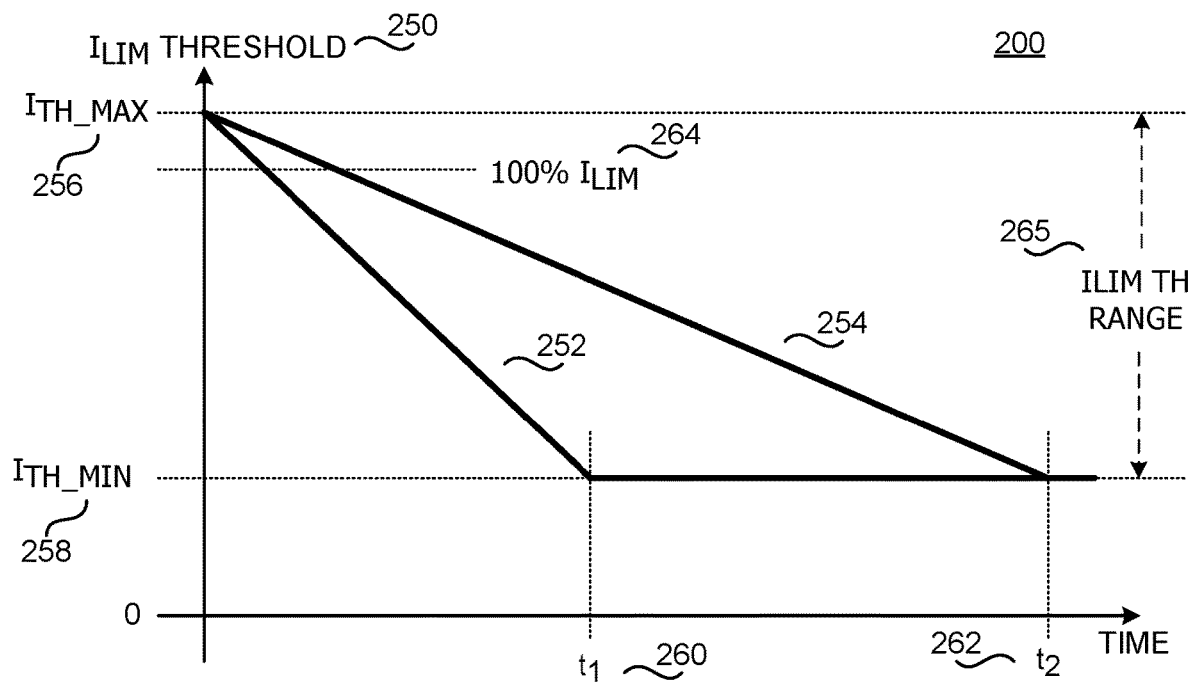
FIG. 2A is a graph illustrating an example current limit threshold waveforms, in accordance with the teachings of the present invention.

FIG. 2A illustrates an example graph 200 illustrating example relationships of the current limit threshold $I_{LIM}$ 250 decreasing over time in accordance with the teachings of the present invention. In particular, graph 200 illustrates a first relationship 252 of the current limit threshold $I_{LIM}$ 250, a second relationship 254 of the current limit threshold $_{TH\_MIN}$ 250, a maximum current limit threshold $I_{TH\_MAX}$ 256, a minimum current limit threshold $I_{TH\_MIN}$ 258, a time $t_1$ 260, and a time $t_2$ 262. Further illustrated is a 100% current limit 264 that corresponds to the highest value of the current limit threshold $I_{LIM}$ 250, which the switch current $I_D$ 140 may reach since the current limit threshold $I_{LIM}$ 250 is variable and begins decreasing a fixed time period after the power switch S1 110 turns off. In one example, the fixed time period is substantially zero. In addition, current limit threshold range 265 is the range of values between the minimum current limit threshold $I_{TH\_MIN}$ 258 to the maximum current limit threshold $I_{TH\_MAX}$ 256 which the current limit threshold generator may vary the current limit threshold $I_{LIM}$ 250.

As shown in the example first relationship 252, the current limit threshold $I_{LIM}$ 250 decreases, within a current limit threshold range 265, with a first decrease rate from the maximum current limit threshold $I_{TH\_MAX}$ 256 to the minimum current limit threshold $I_{TH\_MIN}$ 258. The current limit threshold $I_{LIM}$ 250 reaches the minimum current limit threshold $I_{TH\_MIN}$ 258 at time $t_1$ 260. Once the current limit threshold $I_{LIM}$ 250 decreases to the minimum current limit threshold $I_{TH\_MIN}$ 258, the current limit threshold $I_{LIM}$ 250 stops decreasing and is substantially equal to the minimum current limit threshold $I_{TH\_MIN}$ 258.

As shown in the example second relationship 254, the current limit threshold $I_{LIM}$ 250 decreases, within the current limit threshold range 265, with a second decrease rate from the maximum current limit threshold $I_{TH\_MAX}$ 256 to the minimum current limit threshold $I_{TH\_MIN}$ 258. The current limit threshold $I_{LIM}$ 250 reaches the minimum current limit threshold $I_{TH\_MIN}$ 258 at time $t_2$ 262. Once the minimum current limit threshold $I_{TH\_MIN}$ 258 is reached, the current limit threshold $I_{LIM}$ 250 stops decreasing and is substantially equal to the minimum current limit threshold $I_{TH\_MIN}$ 258. The first relationship 252 and the second relationship 254 illustrate the current limit threshold $I_{LIM}$ 250 substantially linearly decreasing with respect to time. However, examples may also include relationships in which the current limit threshold $I_{LIM}$ 250 is non-linear and/or monotonic. For example, the relationship may be quadratic, exponential, or piecewise linear. Further examples may also include relationships in which the current limit threshold $I_{LIM}$ 250 may include a series of decreasing steps. The series of decreasing steps may be substantially linearly decreasing or non-linearly decreasing.

In one example controller may select the first relationship 252 or the second relationship 254 to utilize for decreasing the current limit threshold 250. For instance, in one example the controller may select the first relationship 252 or the second relationship 254 in response to the input voltage $V_{IN}$ 102 of the power converter 100. The current limit threshold $I_{LIM}$ 250 illustrated in FIG. 2A may be utilized to vary the current limit threshold signal $U_{ILIM\_TH}$ 148. In particular, the relationships shown in FIG. 2A may be utilized to determine how the current limit threshold signal $U_{ILIM\_TH}$ 148 responds to the enable signal $U_{EN}$ 138 and/or drive signal 144.

Figure 2B:
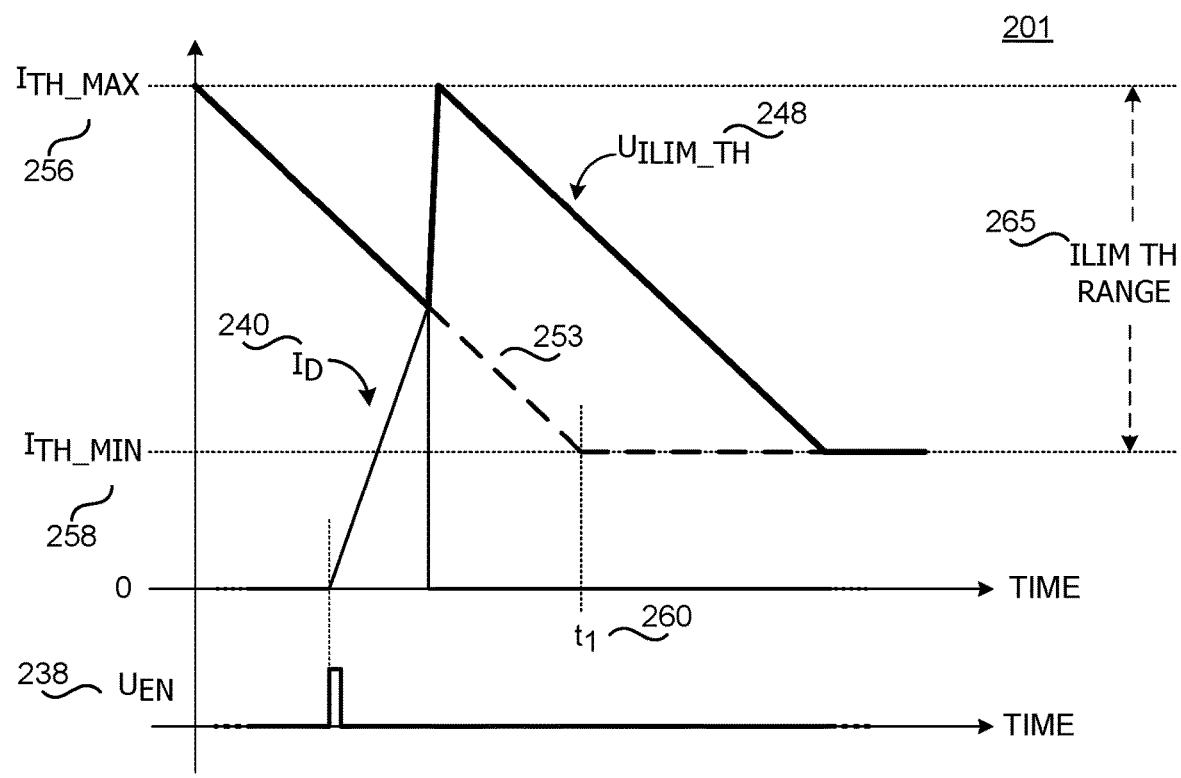
FIG. 2B is a timing diagram illustrating an example current limit threshold and enable signal, in accordance with the teachings of the present invention.

FIG. 2B illustrates another example graph 201 illustrating the relationship of the current limit threshold signal $U_{ILIM\_TH}$ 248 over time. In the depicted example, the current limit threshold signal $U_{ILIM\_TH}$ 248, switch current $I_D$ 240, and enable signal $U_{EN}$ 238 are respective examples of current limit threshold signal $U_{ILIM\_TH}$ 148, switch current $I_D$ 140, and enable signal $U_{EN}$ 138 discussed above with respect to FIG. 1. In addition, the first relationship 252 may be utilized to determine how the current limit threshold signal $U_{ILIM\_TH}$ 248 responds to the enable signal $U_{EN}$ 238.

As illustrated in the depicted example, the current limit threshold signal $U_{ILIM\_TH}$ 248 decreases, within the current limit threshold range 265, from the maximum current limit threshold $I_{TH\_MAX}$ 256. When an enable event occurs in enable signal $U_{EN}$ 238, which is indicated in the example with the enable signal $U_{EN}$ 238 pulsing to a logic high value (in other words, an enable pulse is received), the power switch S1 110 is turned ON and the switch current $I_D$ 240 begins to increase. When the switch current $I_D$ 240 reaches the current limit threshold signal $U_{ILIM\_TH}$ 248, the power switch S1 110 is turned OFF and the switch current $I_D$ 240 falls to zero. Further, the current limit threshold signal $U_{ILIM\_TH}$ 248 increases in response to the power switch S1 110 being turned OFF. In one example, the current limit threshold signal $U_{ILIM\_TH}$ 248 increases to the maximum current limit threshold $I_{TH\_MAX}$ 256. However, in other examples the current limit threshold signal $U_{ILIM\_TH}$ 248 increases by a fixed amount within the current limit threshold range 265. In the example illustrated in FIG. 2B, once the current limit threshold signal $U_{ILIM\_TH}$ 248 reaches the maximum current limit threshold $I_{TH\_MAX}$ 256, the current limit threshold signal $U_{ILIM\_TH}$ 248 begins to decrease again. In the example shown in FIG. 2B, another enable pulse is not received from the enable signal $U_{EN}$ 238 and as such the current limit threshold signal $U_{ILIM\_TH}$ 248 decreases, within the current limit threshold range 265, to the minimum current limit threshold $I_{TH\_MIN}$ 258. FIG. 2B also illustrates a dashed line 253 that shows how the current limit threshold signal $U_{ILIM\_TH}$ 248 would have decreased, within the current limit threshold range 265, if the enable event in enable signal $U_{EN}$ 238 had not been received and the power switch S1 110 had therefore had not been turned ON.

Figure 3:
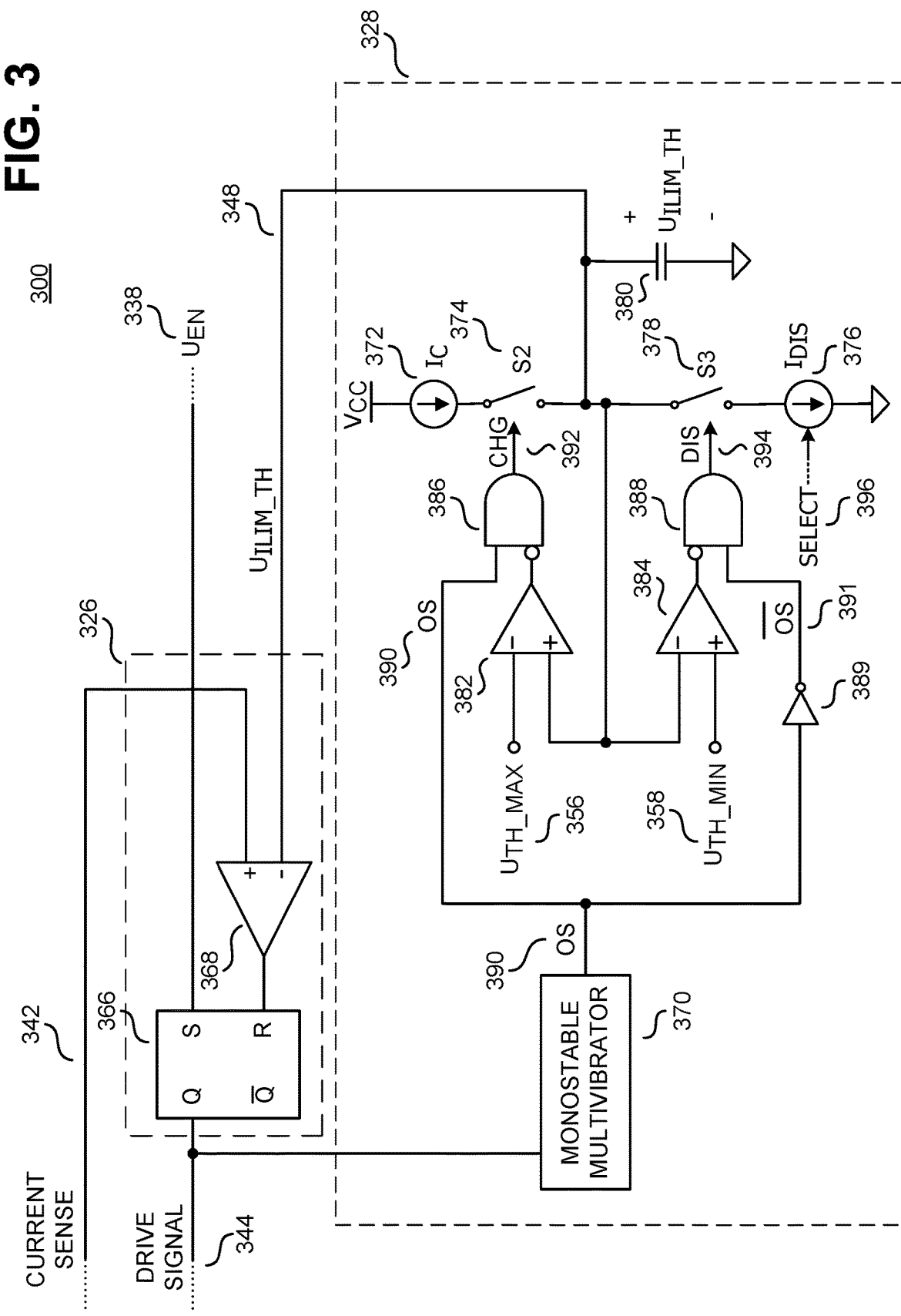
FIG. 3 is a diagram illustrating one example of the controller of FIG. 1, in accordance with the teachings of the present invention.

FIG. 3 illustrates an example controller 300, which in one example may be controller 100 of FIG. 1. It should be appreciated that similarly named and numbered elements referenced below are coupled and function as described above. As mentioned above, drive circuit 326 is coupled to receive the enable signal $U_{EN}$ 338, current sense signal 342 and the current limit threshold signal $U_{ILIM\_TH}$ 348. In the illustrated example, drive circuit 326 is shown including latch 366, which in the illustrated example is coupled to be reset by comparator 368. In the example, latch 366 is coupled to receive the enable signal $U_{EN}$ 338 at its S-input while the output of comparator is coupled to the R-input of latch 366. The drive signal 344 is output from the latch 366. As shown, the drive signal 344 is output from the Q-output of latch 366. As will be further discussed, the Q-output of the latch 366 is logic high if the enable signal $U_{EN}$ 338 is logic high. In one example, the enable signal $U_{EN}$ 338 is a rectangular pulse waveform, which transitions to a logic high value and quickly falls to a logic low value. In one example, the occurrence of a logic high pulse of the enable signal $U_{EN}$ 338 may be referred to as an enable event. When an enable event is received at the S-input of latch 366, the drive signal 344 transitions to a logic high value. Drive signal 344 transitions to a logic low value when a logic high value is received at the R-input of latch 366.

As shown in the depicted example, comparator 368 is coupled to receive the current sense signal 342 and the current limit threshold signal $U_{ILIM\_TH}$ 348. In the example shown in FIG. 3, the current sense signal 342 is received at the non-inverting input of comparator 368 while the current limit threshold signal $U_{ILIM\_TH}$ 348 is received at the inverting input of comparator 368. Drive signal 344 transitions to a logic low value when the current sense signal 342 reaches the current limit threshold signal $U_{ILIM\_TH}$ 348. As mentioned above, in one example the current sense signal 342 is representative of the switch current $I_D$ 140. As such, the drive signal 344 transitions to a logic low value when the switch current $I_D$ 140 represented with current sense signal 342 reaches the current limit threshold signal $U_{ILIM\_TH}$ 348. In one example, the drive signal 344 is a rectangular pulse waveform with varying lengths of logic high and logic low sections. In one example, the length of time that the drive signal 344 is logic high corresponds to the ON time ($t_{ON}$) of the power switch S1 110 and the length of time the drive signal 344 is logic low corresponds to the OFF time ($t_{OFF}$) of the power switch S1 110. In addition, the length of time between rising edges of the drive signal 344 may be referred to as the switching period $T_S$.

Current limit threshold generator 328 is coupled to receive the drive signal 344 from the drive circuit 326. In the example depicted in FIG. 3, a monostable multivibrator 370 is coupled to receive the drive signal 344 from latch 366. In one example, the monostable multivibrator 370 generates a pulse with a fixed time period (in other words, the pulse is logic high for a fixed time period) in response to an edge of the drive signal 344. In one example, the monostable multivibrator 370 generates a pulse with a fixed time period in response to the falling edge of the drive signal 344. In other words, the monostable multivibrator 370 generates a pulse with a fixed time period at the end of the ON time ($t_{ON}$) of the power switch. The output of the monostable multivibrator 370 is referred to as the one shot signal OS 390.

As illustrated, AND gate 386 and inverter 389 are coupled to receive the one shot signal OS 390 from the monostable multivibrator 370. The inverter 389 is further coupled to AND gate 388 such that AND gate 388 receives the inverted one shot signal $\overline{OS}$ 391. AND gates 386 and 388 output the charge signal CHG 392 and discharge signal DIS 394 (respectively) to control switching of switches S2 374 and S3 378. One end of switch S2 374 is coupled to current source 372 while the other end of switch S2 374 is coupled to one end of switch S3 378. The other end of switch S3 378 is coupled to current source 376. One end of capacitor 380 is coupled to a node between switch S2 374 and switch S3 378. As illustrated, the voltage across capacitor 380 is output from the current limit threshold generator 328 as current limit threshold signal $U_{ILIM\_TH}$ 348.

In one example, current source 376 may be a controlled current source. As illustrated in FIG. 3, current source 376 may be coupled to receive select signal SELECT 396. Select signal 396 may be utilized to select the magnitude of $I_{DIS}$ of current source 376. Referring back to the examples depicted FIG. 2A, the first or second relationship 252 or 254 may be selected for the current limit threshold 250 in response to the input voltage $V_{IN}$ 102 of the power converter 100. As will be further discussed, the magnitude of $I_{DIS}$ of current source 376 affects the discharge rate of the capacitor 380. As such, the select signal 396 may select the magnitude of $I_{DIS}$ of current source 376 in response to the input voltage $V_{IN}$ 102 of the power converter in accordance with the teachings of the present invention. For instance, in one example, select signal 396 may set a first magnitude for $I_{DIS}$ for a first input voltage value for $V_{IN}$ 102 and select signal 396 may set a second magnitude for $I_{DIS}$ for a second input voltage value for $V_{IN}$ 102 in accordance with the teachings of the present invention. In other words, in one example, a plurality of different $I_{DIS}$ magnitudes for current source 376 may be selected in response to the input voltage $V_{IN}$, as represented with select signal 396 in FIG. 3, in accordance with the teachings of the present invention. In one example, a lower input voltage $V_{IN}$ 102 may correspond to a larger magnitude for $I_{DIS}$. In another example, a first magnitude of $I_{DIS}$ for the current source 376 may be selected for a first range of $V_{IN}$ 102 and a second magnitude of $I_{DIS}$ for the current source 376 may be selected for second range of $V_{IN}$ 102. In one example, there could be several ranges of $V_{IN}$ 102 and corresponding magnitudes of $I_{DIS}$ for the current source 376. The ranges of $V_{IN}$ 102 in one example, could correspond to ac voltage ranges needed to operate in different geographies; 100 VAC−15% to 115 VAC+15% for Japan and the U.S., 230 VAC+/−15% for Europe, etc.

Both comparators 382 and 384 are coupled to capacitor 380 to receive the current limit threshold signal $U_{ILIM\_T}$ 348.

As illustrated, comparator 382 receives the current limit threshold signal $U_{ILIM\_TH}$ 348 at its non-inverting input while comparator 384 receives the current limit threshold signal $U_{ILIM\_TH}$ 348 at its inverting input. Comparator 382 also receives the maximum current limit threshold $U_{TH\_MAX}$ 356 at its inverting input while the comparator 384 receives the minimum current limit threshold $U_{TH\_MIN}$ 358 at its non-inverting input. In the illustrated example, AND gates 386 and 388 are coupled to receive the inverted outputs of comparator 382 and 384, respectively, as illustrated by the small circle at one of the inputs for both AND gates 386 and 388.

When the one shot signal OS 390 transitions to a logic high value, the charging signal CHG transitions to a logic high value and switch S2 374 is closed. In addition, the discharge signal DIS 394 transitions to a logic low value and opens switch S3 378. As such, the capacitor 380 is charged by current source 372 with current $I_C$. In one example, the amount at which the voltage (i.e., the current limit threshold signal $U_{ILIM\_TH}$ 348) across capacitor 380 increases is proportional to the magnitude of current $I_C$ provided by current source 372 and the amount of time the one shot signal OS 390 is logic high (i.e., the fixed time period). In particular, the amount which the current limit threshold signal $U_{ILIM\_TH}$ 348 increases is substantially equal to the product of the magnitude of current $I_C$ and the fixed time period divided by the capacitance of capacitor 380. Or mathematically:

$$\Delta U_{ILIM\_TH} \cong \frac{I_C t_{FIXED}}{C}.$$

Or in other words, the increase rate of the current limit threshold signal $U_{ILIM\_TH}$ 380 is proportional to the magnitude of current $I_C$ and the capacitance of capacitor 380.

Charging signal CHG 392 transitions to logic low if the one shot signal OS 390 transitions to a logic low value or the voltage across capacitor 380 (i.e., current limit threshold signal $U_{ILIM\_TH}$ 348) reaches the maximum current limit threshold $U_{TH\_MAX}$ 356. When the charging signal CHG 392 is a logic low value, the switch S2 374 opens and capacitor 380 is no longer charged by current source 372.

When the inverted one shot signal $\overline{OS}$ 391 transitions to the logic high value, the discharging signal DIS 394 transitions to a logic high value and closes switch S3 378. As such, the capacitor 380 is discharged by the current source 376 with current $I_{DIS}$. The decrease rate of the current limit threshold signal $U_{ILIM\_TH}$ 348 is proportional to the magnitude of current $I_{DIS}$ and the capacitance of capacitor 380. In one example, the magnitude of the increase rate is greater than the magnitude of the decrease rate.

Discharging signal DIS 394 transitions to logic low if the inverted one shot signal $\overline{OS}$ 391 transitions to a logic low value or if the voltage across capacitor 380 (i.e., current limit threshold signal $U_{ILIM\_TH}$ 348) reaches the minimum current limit threshold $U_{TH\_MIN}$ 358. When the discharging signal DIS 394 is a logic low value, the switch S3 378 opens and capacitor 380 is no longer discharged by current source 376.

Figure 4:
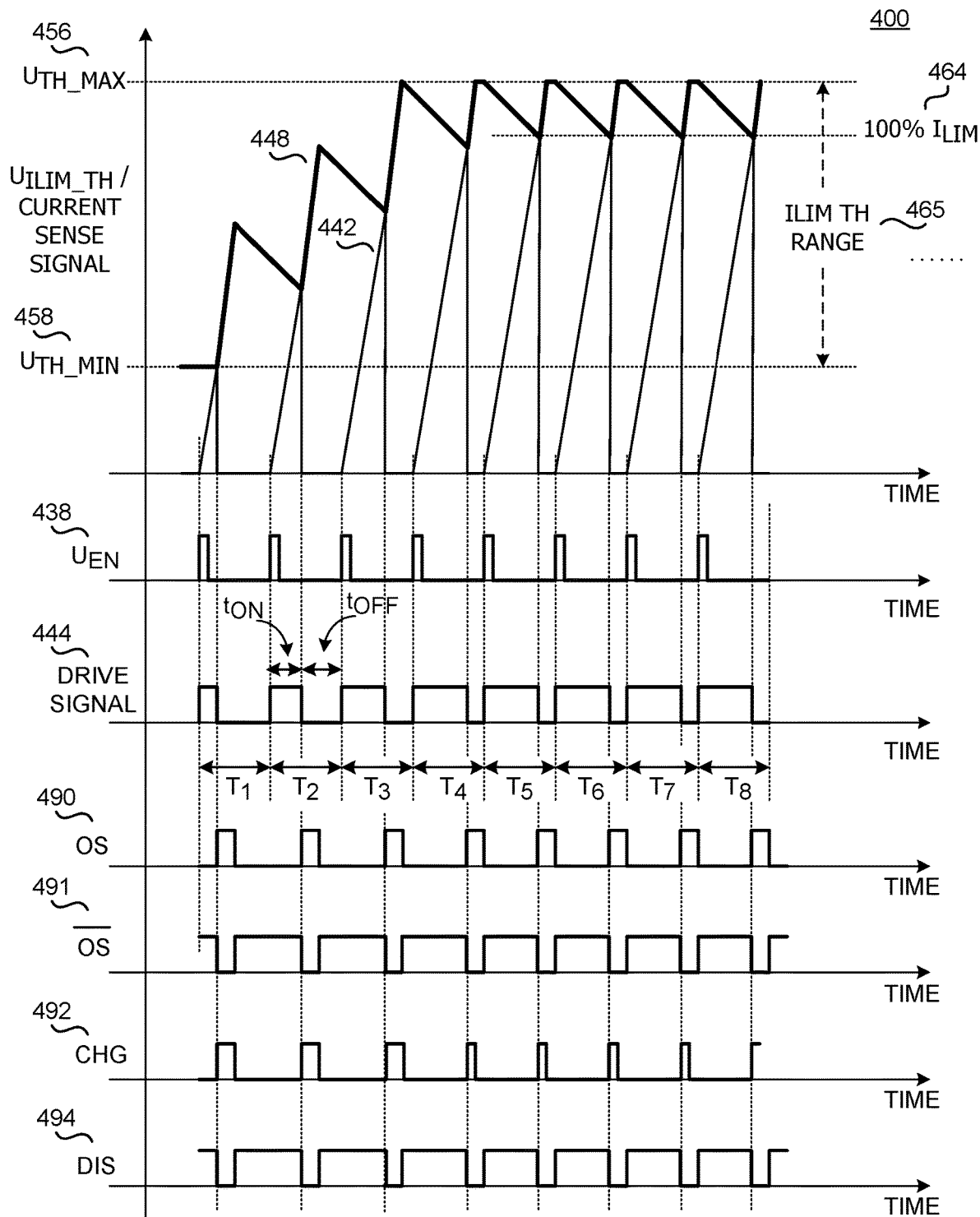
FIG. 4 is a timing diagram illustrating various example waveforms representing signals of the example controller of FIG. 3, in accordance with the teachings of the present invention.

Referring to FIG. 4, a timing diagram 400 that illustrates various example waveforms of signals of the controller 300 of FIG. 3 is shown in accordance with the teachings of the present invention. It should be appreciated that similarly named and numbered elements referenced below are coupled and function as described above. In the example depicted in FIG. 4, the current limit threshold range 465 is the range of values between the minimum current limit threshold $U_{TH\_MIN}$ 458 to the maximum current limit threshold $U_{TH\_MAX}$ 456 which the current limit threshold generator 328 may vary the current limit threshold signal $U_{ILIM\_TH}$ 448. The waveforms described in the timing diagram 400 illustrate that, in one example, a fixed increase amount of the current limit threshold signal $U_{ILIM\_TH}$ 448 for each fixed time period in which one shot signal OS 490 is a logic high is less than the current limit threshold range 465 such that a plurality of consecutive switching cycles of the power switch S1 110 occur before the current limit threshold generator 328 can vary the current limit threshold signal $U_{ILIM\_TH}$ 448 from the minimum current limit threshold $U_{TH\_MIN}$ 458 up to the maximum current limit threshold $U_{TH\_MAX}$ 456. For instance, in the example shown in FIG. 4, three consecutive switching periods are utilized to vary the current limit threshold signal $U_{ILIM\_TH}$ 448 from the minimum current limit threshold $U_{TH\_MIN}$ 458 to the maximum current limit threshold $U_{TH\_MAX}$ 456. In other examples (not shown), the current limit threshold signal $U_{ILIM\_TH}$ 448 for each fixed time period could vary from the minimum current limit threshold $U_{TH\_MIN}$ 458 up to the maximum current limit threshold $U_{TH\_MAX}$ 456.

To illustrate, at the beginning of switching period $T_1$, the current limit threshold signal $U_{ILIM\_TH}$ 448 (shown as the bolded line) is substantially equal to the minimum current limit threshold $U_{TH\_MIN}$ 458. An enable event is received (as shown by the enable signal $U_{EN}$ 438 transitioning to a logic high value) by the latch 366 and the drive signal 444 transitions to a logic high value, which therefore turns ON the power switch S1 110. The current sense signal 442 (representative of the switch current $I_D$ 140) begins to increase from zero. The rate at which the switch current $I_D$ 140 and current sense signal 442 increases is proportional to the input voltage $V_{IN}$ of the power converter. When the current sense signal 442 reaches the current limit threshold signal $U_{ILIM\_TH}$ 448, the output of comparator 368 transitions to a logic high value, which resets latch 366 causing the drive signal 444 to transition to a logic low value and the power switch S1 110 is turned OFF. As shown, the time in which the drive signal 444 is logic high is referred to as the ON time ($t_{ON}$) of the power switch S1 110 and the time in which the drive signal 444 is logic low may be referred to as the OFF time ($t_{OFF}$) of the power switch S1 110. Once the power switch is turned OFF, the current sense signal 442 falls to zero.

At the falling edge of the drive signal 444 during switching period $T_1$, the one shot signal OS 490 transitions to a logic high value for a fixed time period. During switching period $T_1$, the value of the current limit threshold signal $U_{ILIM\_TH}$ 448 is less than the maximum current limit threshold $U_{TH\_MAX}$ 456 for the entirety of the fixed time period. As such, the output of comparator 382 is logic low and the charge signal CHG 392 is logic high for as long as the one shot signal OS 490 is logic high. Switch S2 374 is closed and the capacitor is charged by current source 372. As a result, the current limit threshold signal $U_{ILIM\_TH}$ 448 increases for as long as the charge signal CHG 392 is logic high.

As illustrated the current limit threshold signal $U_{ILIM\_TH}$ 448 increases, within the current limit threshold range 465, with a increase rate during a fixed time period after the end of the ON time $T_{ON}$ of the power switch. Referring back to FIG. 3, the increase rate for the current limit threshold signal $U_{ILIM\_T}$ 448 is substantially proportional to the current $I_C$ provided by current source 372 and the capacitance of capacitor 380. In particular, the maximum amount which the current limit threshold signal $U_{ILIM\_TH}$ 448 may increase by is substantially equal to the product of the magnitude of current $I_C$ and the fixed time period divided by the capacitance of capacitor 380. As shown in the illustrated example, the maximum amount that the current limit threshold signal $U_{ILIM\_T}$ 448 may increase is less than the current limit threshold range 465.

The inverted one shot signal $\overline{OS}$ 491 transitions to a logic high value as the one shot signal OS 490 transitions to a logic low value at the end of the fixed time period. The output of comparator 384 is logic low as long as the value of the current limit threshold signal $U_{ILIM\_TH}$ 448 is greater than the minimum current limit threshold $U_{TH\_MIN}$ 458. As such, the discharge signal DIS 494 output from AND gate 388 is logic high until the inverted one shot signal $\overline{OS}$ 491 transitions to a logic low value or the value of the current limit threshold signal $U_{ILIM\_TH}$ 448 reaches the minimum current limit threshold $U_{TH\_MIN}$ 458. As illustrated, the current limit threshold signal $U_{ILIM\_TH}$ 448 decreases with a decrease rate until the current sense signal 442 reaches the current limit threshold signal $U_{ILIM\_TH}$ 448. Referring back to FIG. 3, the decrease rate is substantially proportional to the current $I_{DIS}$ provided by current source 376 and the capacitance of capacitor 380.

At the start of switching period $T_2$, the current limit threshold signal $U_{ILIM\_TH}$ 448 is still decreasing with the decrease rate. Another enable event is received (as shown by the enable signal $U_{EN}$ 438 transitioning to a logic high value at the start of switching period $T_2$), which sets the latch 366 and causes the drive signal 444 to transition to a logic high value, which turns ON power switch S1 110. When the current sense signal 442 reaches the current limit threshold signal $U_{ILIM\_TH}$ 448 (which is still decreasing), the output of comparator 368 transitions to a logic high value, which resets latch 366 and causes the drive signal 444 to transition to a logic low value, which turns OFF the power switch S1 110.

Continuing with the example depicted in FIG. 4, the one shot signal OS 490 transitions to a logic high value at the end of the ON time $T_{ON}$ during switching period $T_2$. Similar to switching period $T_1$, during switching period $T_2$ the value of the current limit threshold signal $U_{ILIM\_TH}$ 448 is less than the maximum current limit threshold $U_{TH\_MAX}$ 456 for the entirety of the fixed time period at which the one shot signal OS 490 is logic high. As such, the charge signal CHG 492 is logic high for the entirety of the fixed time period and transitions to a logic low value when the one shot signal OS 490 transitions to a logic low value after the fixed time period. Or in other words, the charge signal CHG 492 substantially follows the one shot signal OS 490. At the end of the fixed time period (i.e., one shot signal OS 490 has transitioned to a logic low value and the inverted one shot signal $\overline{OS}$ 491 has transitioned to a logic high value), the current limit threshold signal $U_{ILIM\_TH}$ 448 decreases with the decrease rate until the minimum current limit threshold $U_{TH\_MIN}$ 458 or the current sense signal 442 reaches the current limit threshold signal $U_{ILIM\_TH}$ 448. In the example shown, the current limit threshold signal $U_{ILIM\_TH}$ 448 decreases until the current sense signal 442 reaches the current limit threshold signal $U_{ILIM\_TH}$ 448.

As shown in the depicted example, another enable event is received at the start of switching period $T_3$ and the current limit threshold signal $U_{ILIM\_TH}$ 448 is still decreasing with the decrease rate. Switching period $T_3$ is similar to switching period $T_2$. However, at the end of the fixed time period of the one shot signal OS 490, the current limit threshold signal $U_{ILIM\_TH}$ 448 has just reached the maximum current limit threshold $U_{TH\_MAX}$ 456. At the end of the fixed time period, the current limit threshold signal $U_{ILIM\_TH}$ 448 begins decreasing.

Another enable event is received at the start of switching period $T_4$ and the current limit threshold signal $U_{ILIM\_TH}$ 448 is still decreasing with the decrease rate. The drive signal 444 transitions to a logic high value and the power switch is turned ON. When the current sense signal 442 reaches the current limit threshold signal $U_{ILIM\_TH}$ 448 the output of comparator 368 transitions to a logic high value and the drive signal 444 transitions to a logic low value and the power switch is turned OFF.

The one shot signal OS 490 transitions to a logic high value at the end of the ON time $T_{ON}$ during switching period $T_4$. At the end of the ON time $T_{ON}$ during switching period $T_4$, the value of the current limit threshold signal $U_{ILIM\_TH}$ 448 is less than the maximum current limit threshold $U_{TH\_MAX}$ 456. As such the output of comparator 382 is logic low and the charge signal CHG 492 is logic high. Switch S2 374 is turned ON and the current limit threshold signal $U_{ILIM\_TH}$ 448 begins to increase.

However, unlike switching periods $T_1$, $T_2$, and $T_3$, the current limit threshold signal $U_{ILIM\_TH}$ 448 reaches the maximum current limit threshold $U_{TH\_MAX}$ 456 before the end of the fixed time period (i.e., the one shot signal OS 490 is still logic high). When the current limit threshold signal $U_{ILIM\_TH}$ 448 reaches the maximum current limit threshold $U_{TH\_MAX}$ 456, the output of comparator 382 is logic high and the charge signal CHG 492 transitions to a logic low value. As such, switch S2 374 is turned OFF and the capacitor 380 is no longer charged by current source 372. As will be further illustrated in FIG. 5, the current limit threshold signal $U_{ILIM\_TH}$ 448 remains substantially equal to the maximum current limit threshold $U_{TH\_MAX}$ 456 for the remainder of the fixed time period in which one shot signal OS 490 is a logic high value. Or in other words, the current limit threshold signal $U_{ILIM\_TH}$ 448 is substantially equal to the maximum current limit threshold $U_{TH\_MAX}$ 456 until the one shot signal OS 490 transitions to a logic low value.

At the end of the fixed time period, the inverted one shot signal $\overline{OS}$ 491 transitions to a logic high value. The output of comparator 384 is logic low since the value of the current limit threshold signal $U_{ILIM\_TH}$ 448 is greater than the minimum current limit threshold $U_{TH\_MIN}$ 458. As a result the discharge signal DIS 494 is logic high and the switch S3 378 is closed and the current limit threshold signal $U_{ILIM\_TH}$ 448 decreases until the current sense signal 442 reaches the current limit threshold signal $U_{ILIM\_TH}$ 448 or the current limit threshold signal $U_{ILIM\_TH}$ 448 reaches the minimum current limit threshold $U_{TH\_MIN}$ 458. In the example shown in FIG. 4, the waveforms shown for switching periods $T_5$, $T_6$, $T_7$, and $T_8$ are similar to waveforms described with respect to switching period $T_4$ discussed above.

Figure 5:
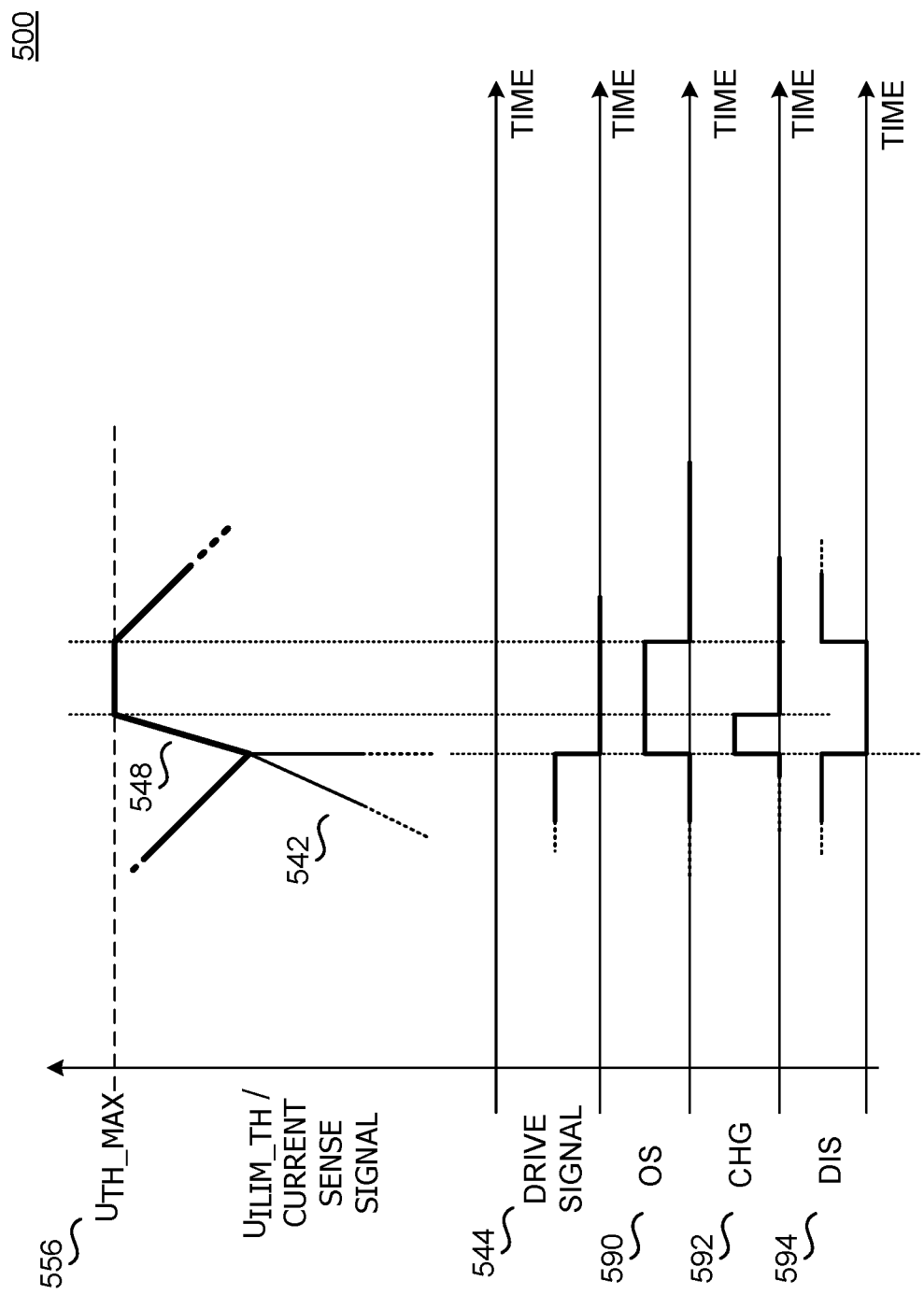
FIG. 5 is a timing diagram illustrating in increased detail various example waveforms representing signals shown in FIG. 4 in accordance with the teachings of the present invention.

FIG. 5 is a timing diagram illustrating in increased detail various example waveforms of signals shown in FIG. 4 in accordance with the teachings of the present invention. In particular, the timing diagram 500 illustrates an example in which the current limit threshold signal $U_{ILIM\_TH}$ 548 is clamped within the current limit threshold range at the maximum current limit threshold $U_{TH\_MAX}$ 556. At the end of the ON time of the power switch S1 100 (as shown by the drive signal 544 transitioning to the logic low value), the one shot signal OS 590 transitions to a logic high value. As mentioned above, the length of time at which the one shot signal OS 590 is logic high may be referred to as the fixed time period. At the beginning of the fixed time period, the current limit threshold signal $U_{ILIM\_TH}$ 548 is less than the maximum current limit threshold $U_{TH\_MAX}$ 556 and the output of comparator 382 is logic low. As such, the charge signal CHG 592 transitions to a logic high value when the one shot signal OS 590 transitions to a logic high value. The switch S2 374 is closed and the current limit threshold signal $U_{ILIM\_TH}$ 548 increases.

However, the current limit threshold signal $U_{ILIM\_TH}$ 548 reaches the maximum current limit threshold $U_{TH\_MAX}$ 556 before the end of the fixed time period of the one shot signal OS 590. The output of comparator 382 transitions to a logic high value and as a result the charge signal CHG 592 transitions to a logic low value. The current limit threshold signal $U_{ILIM\_TH}$ 548 is substantially equal to the maximum current limit threshold $U_{TH\_MAX}$ 556 for the remainder of the fixed time period of the one shot signal OS 590. Once the one shot signal OS 590 transitions to a logic low value, the inverted one shot signal $\overline{OS}$ transitions to a logic high value and the current limit threshold signal $U_{ILIM\_TH}$ 548 begins to decrease.

Figure 6:
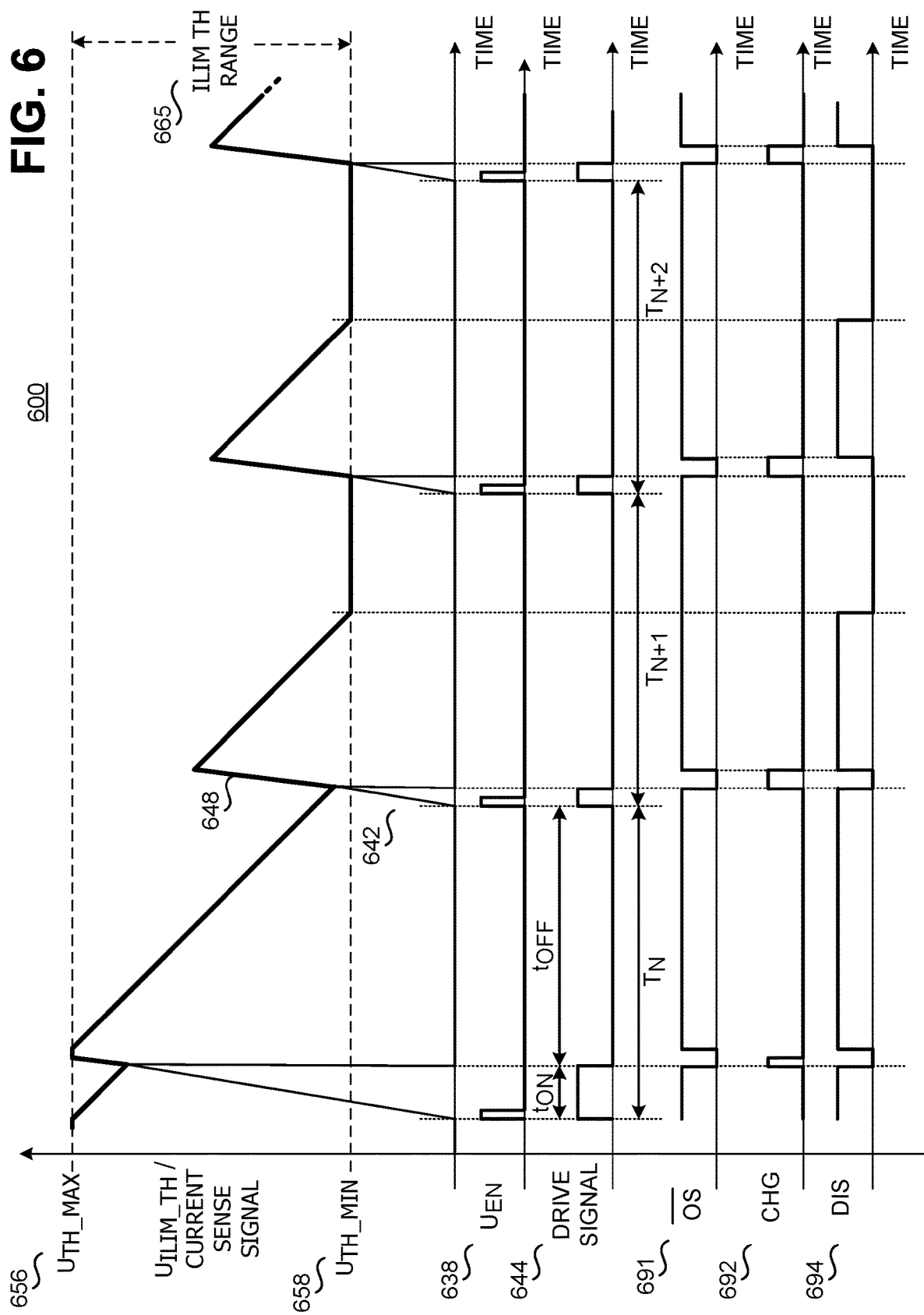
FIG. 6 is another timing diagram illustrating various example waveforms representing signals of the example controller of FIG. 3 in accordance with the teachings of the present invention.

Referring now to FIG. 6, a timing diagram 600 of various example waveforms of signals of the controller 300 of FIG. 3 is shown. It should be appreciated that similarly named and numbered elements referenced below are coupled and function as described above. Further, the waveforms described in the timing diagram 600 illustrate an example in which the current limit threshold signal $U_{ILIM\_TH}$ 648 may be clamped within the current limit threshold range 665 to the minimum current limit threshold $U_{TH\_MIN}$ 658. The current limit threshold range 665 is the range of values between the minimum current limit threshold $U_{TH\_MIN}$ 658 to the maximum current limit threshold $U_{TH\_MAX}$ 656 which the current limit threshold generator 328 may vary the current limit threshold signal $U_{ILIM\_TH}$ 648.

As shown in the example, an enable event is received at the beginning of switching period $T_N$ and the power switch is turned ON. The drive signal 644 transitions to a logic low value and the power switch is turned OFF when the current sense signal 642 reaches the current limit threshold signal $U_{ILIM\_TH}$ 648. Switching period $T_N$ is similar to the switching periods $T_4$ through $T_8$ described above. In the example shown, the current limit threshold signal $U_{ILIM\_TH}$ 648 increases, within the current limit threshold range 665, to the maximum current limit threshold $U_{TH\_MAX}$ 656 and begins to decrease when the discharge signal DIS 694 transitions to a logic high value.

An enable event is received at the beginning of switching period $T_{N+1}$ and the current limit threshold signal $U_{ILIM\_TH}$ 648 is still decreasing. The drive signal 644 transitions to a logic high value and the power switch S1 110 is turned ON. When the switch current $I_D$ 140 represented with current sense signal 642 reaches the current limit threshold signal $U_{ILIM\_TH}$ 648, the drive signal 644 transitions to a logic low value and the power switch S1 110 is turned OFF. As previously discussed, the current limit threshold signal $U_{ILIM\_TH}$ 648 begins to increase at the end of the ON time ($t_{ON}$) of drive signal 644. During switching period $T_{N+1}$, the value of the current limit threshold signal $U_{ILIM\_TH}$ 648 is less than the maximum current limit threshold $U_{TH\_MAX}$ 656 and current limit threshold signal $U_{ILIM\_TH}$ 648 increases for the entirety of the fixed time period of the one shot signal OS. As such, the charge signal CHG 692 is logic high for as long as the one shot signal OS is logic high.

At the end of the fixed time period, the current limit threshold signal $U_{ILIM\_TH}$ 648 is greater than the minimum current limit threshold $U_{TH\_MIN}$ 658 and the inverted one shot signal $\overline{OS}$ 691 transitions to a logic high value. The discharge signal DIS 694 is logic high and the current limit threshold signal $U_{ILIM\_TH}$ 648 begins to decrease within the current limit threshold range 665. However, when the current limit threshold signal $U_{ILIM\_TH}$ 648 reaches the minimum current limit threshold $U_{TH\_MIN}$ 658, the output of comparator 384 transitions to a logic high value and the discharge signal DIS 694 transitions to a logic low value and the current limit threshold signal $U_{ILIM\_TH}$ 648 remains substantially equal to the minimum current limit threshold $U_{TH\_MIN}$ 658. The current limit threshold signal $U_{ILIM\_TH}$ 648 remains clamped to the minimum current limit threshold $U_{TH\_MIN}$ 658 until the end of the next ON time of drive signal 644. In the example shown, the current limit threshold signal $U_{ILIM\_TH}$ 648 begins increasing at the end of the ON time ($t_{ON}$) during switching period $T_{N+2}$.

Figure 7:
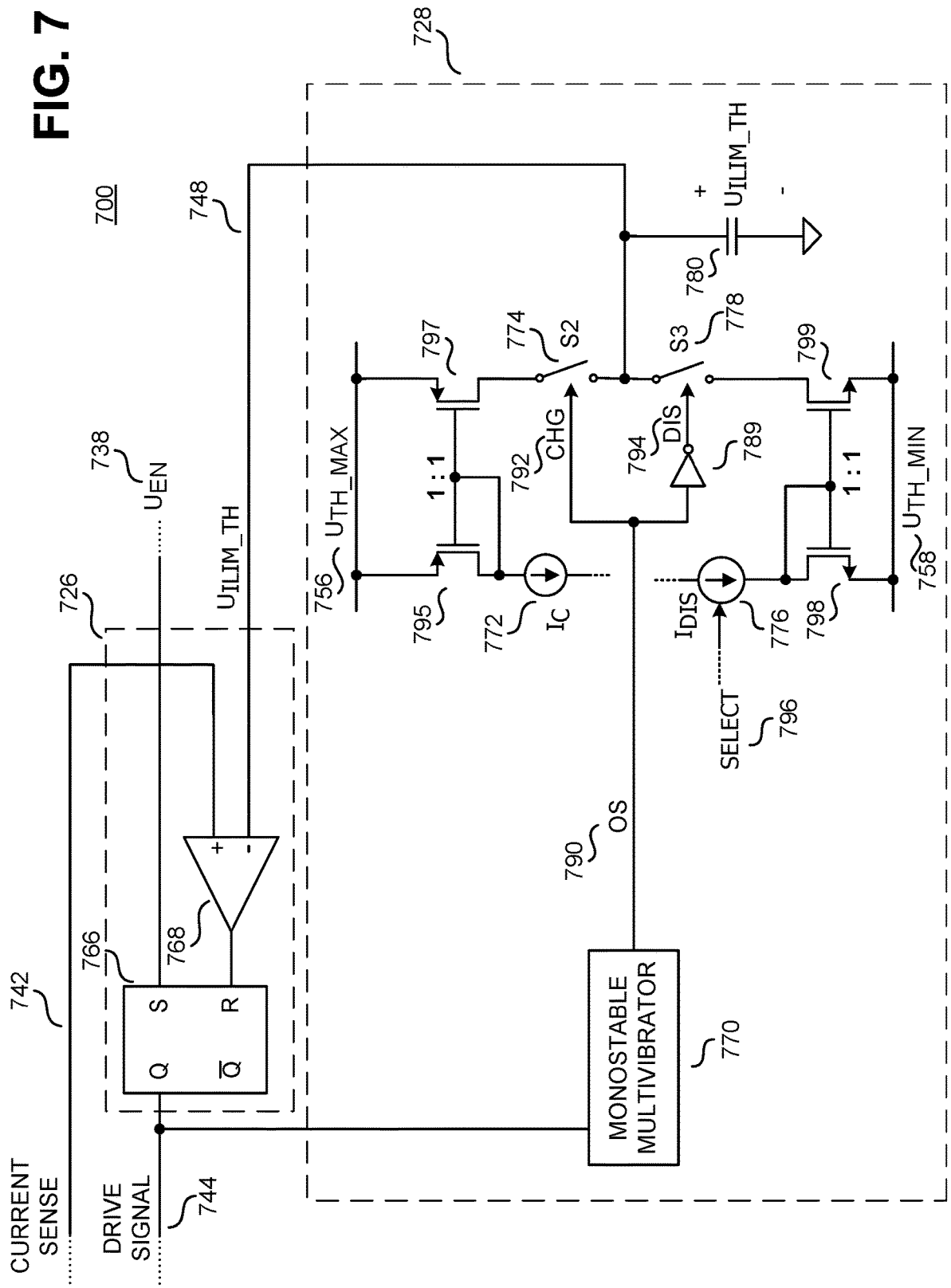
FIG. 7 is a diagram illustrating another example of the controller of FIG. 1, in accordance with the teachings of the present invention.

FIG. 7 illustrates an example controller 700, which is another example of controller 100 shown in FIG. 1 in accordance with the teachings of the present invention. It should be appreciated that similarly named and numbered elements referenced below are coupled and function as described above. Controller 700 shares many similarities with the controller 300 shown in FIG. 3, however, controller 700 includes transistors coupled together as current mirrors that are coupled to charge and discharge switches S2 774 and S 3 778. In addition, the current limit threshold generator 728 utilizes the current mirrors to clamp the current limit threshold signal $U_{ILIM\_TH}$ 748 to either the minimum current limit threshold $U_{TH\_MIN}$ 758 or the maximum current limit threshold $U_{TH\_MAX}$ 756 rather than the comparators and AND gates shown in FIG. 3.

Drive circuit block 726 is similar to drive circuit block 326 shown in FIG. 3. The drive signal 744 is output from the latch 766 to the monostable multivibrator 770. Similar to monostable multivibrator 370 described above, the monostable multivibrator 770 generates a pulse with a fixed time period (in other words, the pulse is logic high for a fixed time period) in response to an edge of the drive signal 744. For example, the monostable multivibrator 770 generates a pulse with a fixed time period in response to the falling edge of the drive signal 744. The output of the monostable multivibrator 770 is referred to as the one shot signal OS 790.

The output of the monostable multivibrator 770 is further coupled to control switching of the switch S2 774. In the example shown, the signal that controls the switch S2 774 is referred to as the charge signal CHG 792. In the example shown, the charge signal CHG 792 is substantially the same as the one shot signal OS 790. Inverter 789 is also coupled to receive the one shot signal OS 790 from the monostable multivibrator 770. The output of the inverter 789 is further coupled to control switching of the switch S3 778. In the example shown, the output of the inverter 789 is referred to as the discharge signal DIS 794. In the example shown, the discharge signal DIS 794 is the inverted one shot signal OS 790.

One end of capacitor 780 is coupled between switch S2 774 and switch S3 778. Further, one end of switch S2 774 is coupled to transistor 797. Transistors 795 and 797 are coupled together as a current mirror. In one example, transistors 795 and 797 are p-type metal oxide semiconductor transistors (MOSFETs). As illustrated, transistors 795 and 797 mirror the current $I_C$ provided by current source 772. In the example shown, the current mirror formed by transistors 795 and 797 are referenced to the maximum current limit threshold $U_{TH\_MAX}$ 756.

Switch S3 778 is further coupled to transistor 799. Transistors 798 and 799 are coupled together as a current mirror. In one example, transistors 798 and 799 are n-type MOSFETs. As illustrated, transistors 798 and 799 mirror the current $I_{DIS}$ provided by current source 776. In one example, current source 776 may be a controlled current source. As illustrated in FIG. 7, current source 776 may be coupled to receive select signal SELECT 796. In one example, select signal 796 may be utilized to vary the magnitude of $I_{DIS}$ of current source 776. In the example shown, the current mirror formed by transistors 798 and 799 are referenced to the minimum current limit threshold $U_{TH\_MIN}$ 758. In the example, the select signal 796 may select the magnitude of $I_{DIS}$ of current source 776 in response to the input voltage $V_{IN}$ of the power converter. For instance, in one example, select signal 796 may set a first magnitude for $I_{DIS}$ in response to a first input voltage value for $V_{IN}$ 102, and select signal 796 may set a second magnitude for $I_{DIS}$ in response to a second input voltage value for $V_{IN}$ 102. In one example, a lower input voltage $V_{IN}$ may correspond to a larger magnitude for US.

In operation, switches S2 774 and S3 778 are opened and closed to charge or discharge the capacitor 780 in response to current sources 772 or 776, respectively. At the falling edge of the drive signal 744, the one shot signal OS 790 transitions to the logic high value for a fixed time period and the switch S2 774 is closed. In addition, the discharge signal DIS 794 transitions to a logic low value and opens switch S3 778. As such the capacitor 780 is charged in response to current source 772 with current $I_C$ and the current limit threshold signal $U_{ILIM\_TH}$ 748 increases. When the one shot signal OS 790 transitions to the logic low value at the end of the fixed time period, the discharging signal DIS 794 transitions to a logic high value and closes switch S3 778. As such the capacitor 780 is discharged in response to the current source 776 with current $I_{DIS}$ and the current limit threshold signal $U_{ILIM\_TH}$ 748 decreases.

However, the current sources formed by transistors 795 and 797 and transistors 798 and 799 are referenced to the maximum current limit threshold $U_{TH\_MAX}$ 756 and the minimum current limit threshold $U_{TH\_MIN}$ 758, respectively. As the voltage across capacitor 780 (i.e., the current limit threshold signal $U_{ILIM\_TH}$ 748) reaches the maximum current limit threshold $U_{TH\_MAX}$ 756, the current mirror formed by transistors 795 and 797 are no longer able to mirror the current $I_C$ provided by current source 772 and will provide less current to charge the capacitor 780. Similar can be said for as the voltage across capacitor 780 (i.e., the current limit threshold signal $U_{ILIM\_TH}$ 748) reaches the minimum current limit threshold $U_{TH\_MIN}$ 758. Thus, as the voltage across capacitor 780 approaches the maximum current limit threshold $U_{TH\_MAX}$ 756 or the minimum current limit threshold $U_{TH\_MIN}$ 758, the rate at which the current limit threshold signal $U_{ILIM\_TH}$ 748 increases or decreases will slow. Or in other words, the magnitude of both the increase rate and the decrease rate of the current limit threshold signal $U_{ILIM\_TH}$ 748 will lessen. In one example, the point in which the current mirrors are unable to correctly mirror current $I_C$ and $I_{DIS}$ (the point at which the increase rate and the decrease rate of the current limit threshold signal $U_{ILIM\_TH}$ 748 start to reduce), respectively, partially depends on the ratio between the channel width and channel length of transistors 795, 797, 798, and 799. Eventually, the current limit threshold generator 728 clamps the current limit threshold signal $U_{ILIM\_TH}$ 748 to either the minimum current limit threshold $U_{TH\_MIN}$ 758 or the maximum current limit threshold $U_{TH\_MAX}$ 756.

Figure 8:
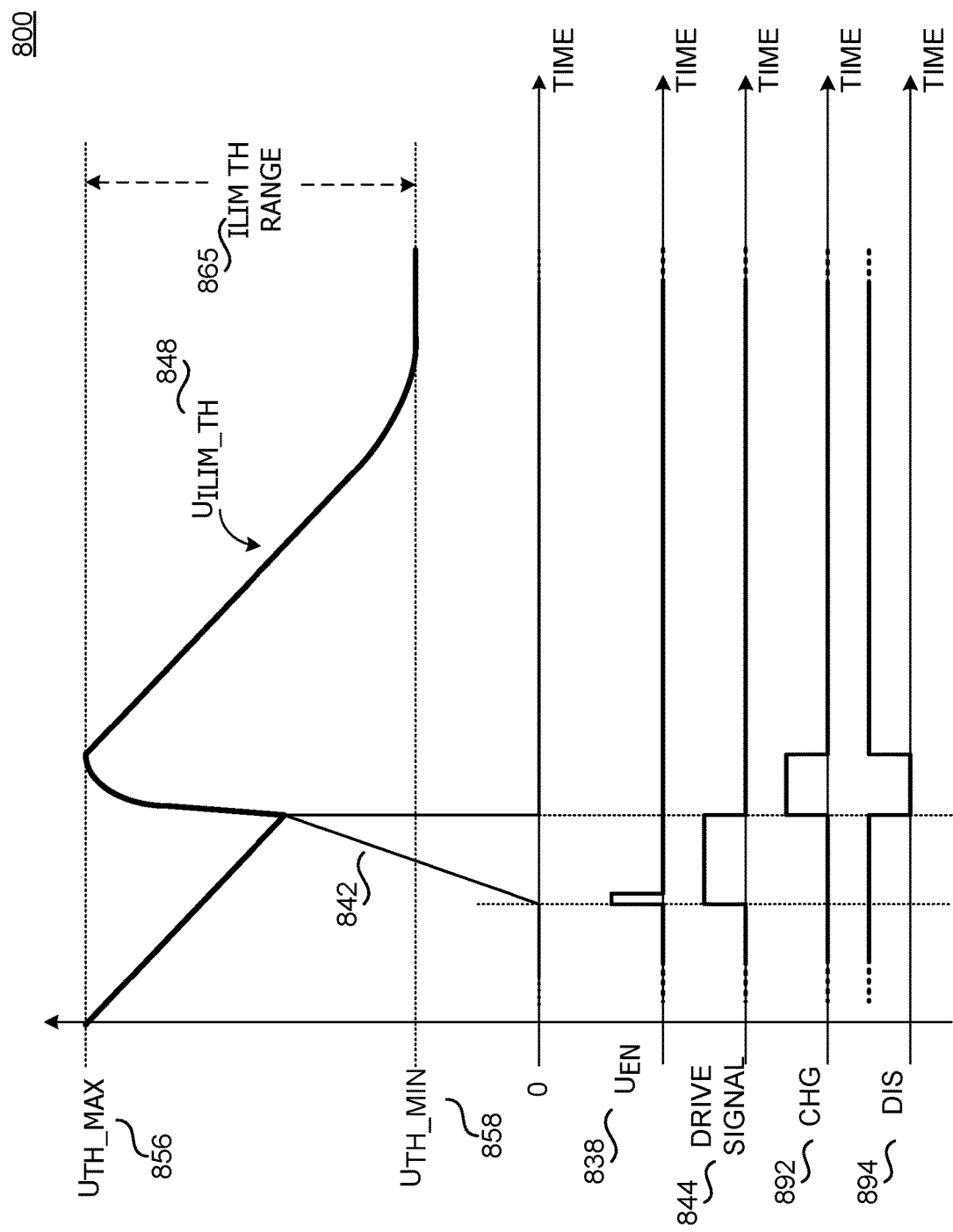
FIG. 8 is a timing diagram illustrating various example waveforms representing signals of the example controller of FIG. 7, in accordance with the teachings of the present invention.

FIG. 8 is a timing diagram illustrating various example waveforms of signals shown in FIG. 7 in accordance with the teachings of the present invention. In particular, the timing diagram 800 illustrates an example in which the current limit threshold signal $U_{ILIM\_TH}$ 848 is clamped within the current limit threshold range at the maximum current limit threshold $U_{TH\_MAX}$ 856 and the minimum current limit threshold $U_{TH\_MIN}$ 858. An enable event is received (as shown by the pulse of enable signal 838) and the drive signal 844 transitions to a logic high value and the power switch S1 110 is turned ON. When the switch current $I_D$ 140 represented with current sense signal 842 reaches the current limit threshold signal $U_{ILIM\_TH}$ 848, the drive signal 844 transitions to a logic low value and the power switch S1 110 is turned OFF. At the end of the ON time, the charge signal CHG 892 transitions to a logic high value and the discharge signal DIS 894 transitions to a logic low value. The switch S2 774 is closed and the current limit threshold signal $U_{ILIM\_TH}$ 848 increases. As mentioned above, the length of time which the charge signal CHG 892 is logic high may be referred to as the fixed time period.

However, as the current limit threshold signal $U_{ILIM\_TH}$ 848 approaches the maximum current limit threshold $U_{TH\_MAX}$ 756 before the end of the fixed time period, the current mirror formed by transistors 795 and 797 is no longer able to mirror the current $I_C$ provided by current source 772 and will provide less current to charge the capacitor 780. As such the increase rate of the current limit threshold signal $U_{ILIM\_TH}$ 848 decreases as shown by the curved characteristic of the current limit threshold signal $U_{ILIM\_TH}$ 848 closer to the maximum current limit threshold $U_{TH\_MAX}$ 856. The shape of the curved characteristic may be partially determined by the ratio between the channel width and channel length of transistor 795 and 797. Once the current limit threshold signal $U_{ILIM\_TH}$ 848 reaches the maximum current limit threshold $U_{TH\_MAX}$ 856, the current mirror formed by transistors 795 and 797 provide substantially no current and the current limit threshold signal $U_{ILIM\_TH}$ 848 is substantially clamped at the maximum current limit threshold $U_{TH\_MAX}$ 856.

At the end of the fixed on time, the discharge signal DIS 894 transitions to a logic high value and switch S3 778 is closed and the current limit threshold signal $U_{ILIM\_TH}$ 848 begins to decrease within the current limit threshold range 865. However, as the current limit threshold signal $U_{ILIM\_TH}$ 848 approaches the minimum current limit threshold $U_{TH\_MIN}$ 858, the current mirror formed by transistors 798 and 799 is no longer able to mirror the current $I_{DIS}$ provided by current source 776 and will provide less current to discharge the capacitor 780. As such, the magnitude of the decrease rate of the current limit threshold signal $U_{ILIM\_TH}$ 848 decreases as shown by the curved characteristic of the current limit threshold signal $U_{ILIM\_TH}$ 848 closer to the minimum current limit threshold $U_{TH\_MIN}$ 858. The shape of the curved characteristic may be partially determined by the ratio between the channel width and channel length of transistor 798 and 798. Once the current limit threshold signal $U_{ILIM\_TH}$ 848 reaches the minimum current limit threshold $U_{TH\_MIN}$ 858, the current mirror formed by transistors 798 and 799 provide substantially no current and the current limit threshold signal $U_{ILIM\_TH}$ 848 is substantially clamped at the minimum current limit threshold $U_{TH\_MIN}$ 858.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller to regulate a power converter, comprising:
    a terminal coupled to receive an enable signal including enable events representative of an output of the power converter;
    a drive circuit configured to generate a drive signal to control switching of a power switch to control a transfer of energy from an input of the power converter to the output of the power converter, wherein the drive circuit is configured to turn on the power switch when an enable event is received in the enable signal; and
    a current limit threshold generator coupled to the drive circuit and configured to generate a threshold signal, wherein the threshold signal increases in response to the power switch turning off and subsequently decreases prior to a receipt of a next enable event, wherein the threshold signal and a time between consecutive enable events are used to modulate the drive signal to regulate the output of the power converter, wherein a decrease rate of the threshold signal slows as the threshold signal approaches a minimum current limit threshold.

2. The controller of claim 1, wherein the drive circuit is configured to turn off the power switch when a current sense signal representative of a current through the power switch reaches the threshold signal.

3. The controller of claim 2, wherein the threshold signal decreases until the threshold signal reaches the minimum current limit threshold or until the current sense signal reaches the threshold signal.

4. The controller of claim 3, wherein the threshold signal decreases in a series of decreasing steps.

5. The controller of claim 3, wherein the controller is configured to select the decrease rate for the threshold signal in response to an input voltage of the power converter.

6. The controller of claim 1, wherein the threshold signal is configured to increase by up to a fixed amount when the power switch is turned off.

7. The controller of claim 1, wherein an increase rate of the threshold signal slows as the threshold signal approaches a maximum current limit threshold.

8. The controller of claim 1, wherein the current limit threshold generator includes:
    a capacitor configured to generate the threshold signal;
    a monostable multivibrator configured to generate a one shot signal in response to the drive signal;
    a first current source configured to charge the capacitor in response to a first value of the one shot signal, wherein an amount at which a voltage across the capacitor increases is proportional to a magnitude of current provided by the first current source and an amount of time the one shot signal is the first value; and
    a second current source configured to discharge the capacitor in response to a second value of the one shot signal, wherein an amount at which the voltage across the capacitor decreases is proportional to a magnitude of current provided by the second current source and a capacitance of the capacitor.

9. The controller of claim 8, wherein the second current source is configured to receive a select signal to select from a plurality of magnitudes for the magnitude of current provided by the second current source in response to an input voltage of the power converter.

10. The controller of claim 1, wherein the threshold signal varies during a switching cycle of the power switch and the time between consecutive enable events is the switching cycle of the power switch.

11. The controller of claim 1, wherein the threshold signal increases and subsequently decreases within a threshold range.

12. The controller of claim 1, wherein the enable signal is received from a secondary controller.

13. The controller of claim 12, wherein the secondary controller is configured to control the turn on and turn off of a synchronous rectifier coupled to the output of a power converter.

14. A controller to regulate a power converter, comprising:
   a terminal coupled to receive an enable signal including enable events representative of an output of the power converter;
   a drive circuit configured to generate a drive signal to control switching of a power switch to control a transfer of energy from an input of the power converter to the output of the power converter, wherein the drive circuit is configured to turn on the power switch when an enable event is received in the enable signal; and
   a current limit threshold generator coupled to the drive circuit and configured to generate a threshold signal, wherein the threshold signal increases in response to the power switch turning off and subsequently decreases prior to a receipt of a next enable event, wherein the threshold signal and a time between consecutive enable events are used to modulate the drive signal to regulate the output of the power converter,
   wherein the drive circuit is configured to turn off the power switch when a current sense signal representative of a current through the power switch reaches the threshold signal,
   wherein the threshold signal decreases until the threshold signal reaches a minimum current limit threshold or until the current sense signal reaches the threshold signal, and
   wherein a decrease rate of the threshold signal slows as the threshold signal approaches the minimum current limit threshold.

\* \* \* \* \*